Patented Sept. 5, 1939

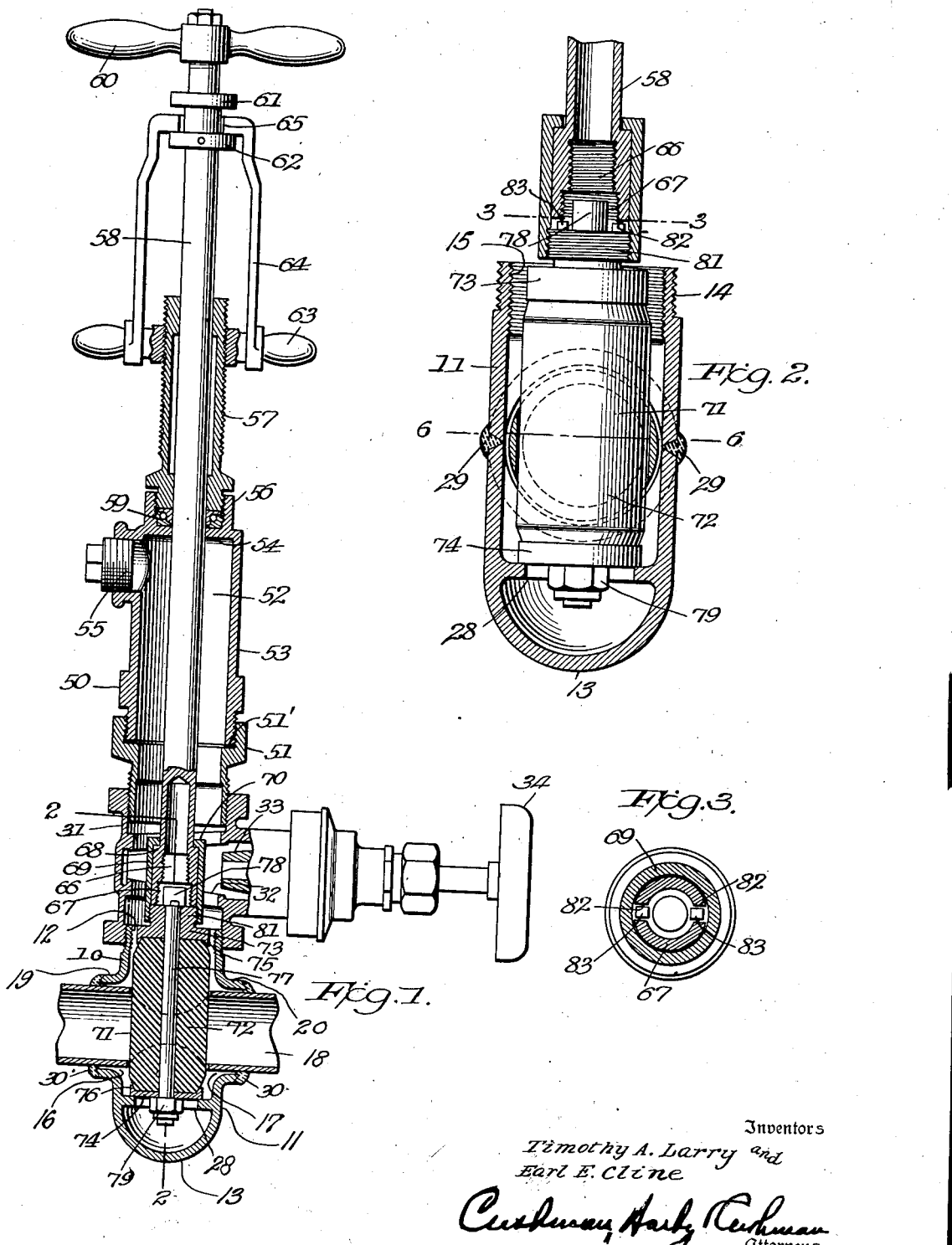

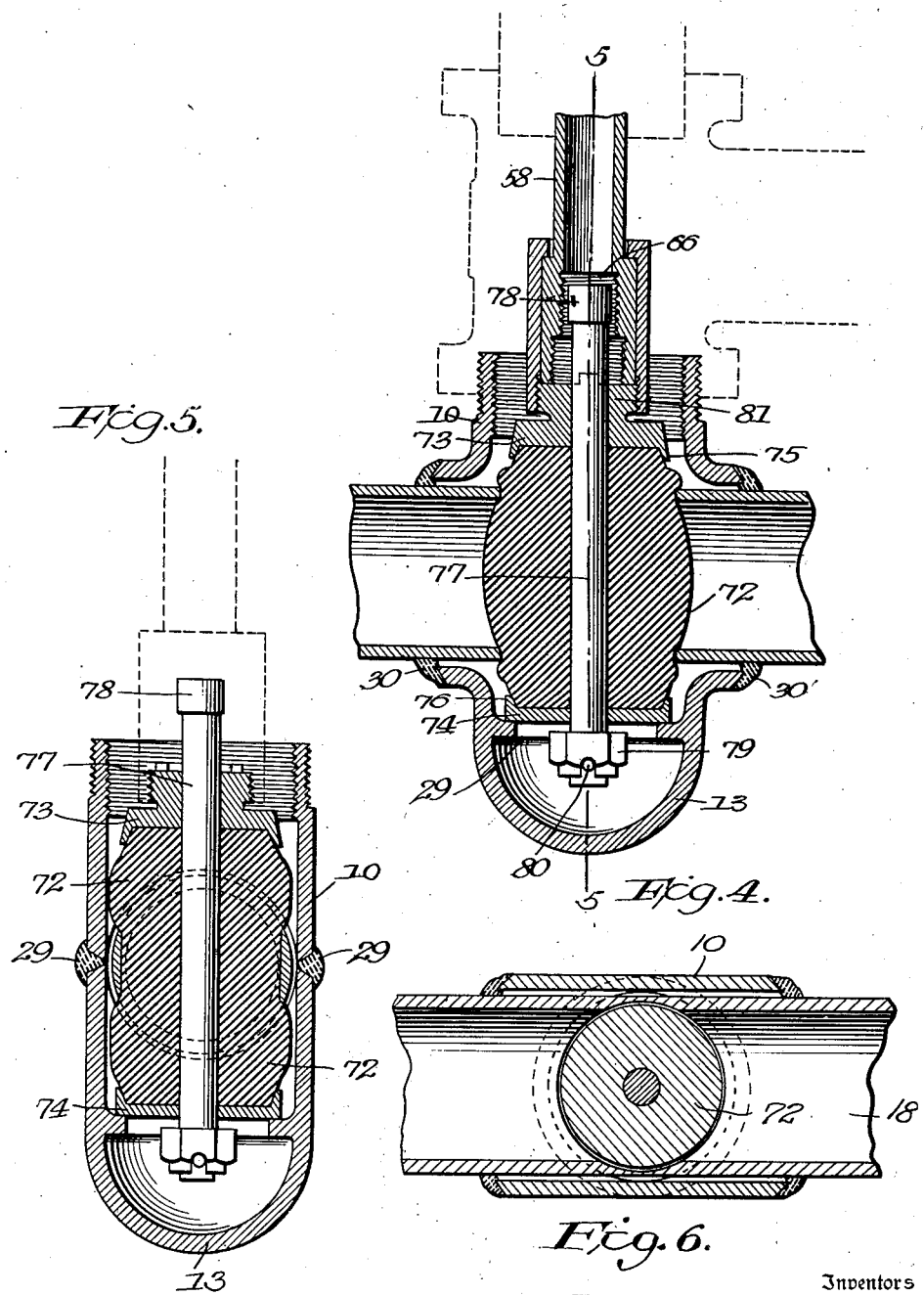

2,171,938

UNITED STATES PATENT OFFICE 2,711,938

VALVE BODY OR FITTING

Timothy A. Larry and Earl E. Cline, Decatur, Ill.; said Cline assignor to Mueller Co., Decatur, Ill., a corporation of Illinois Original application September 14, 1936, Serial No. 100,782. Divided and this application January 25, 1937, Serial No. 122,248

2 Claims. (Cl. 251—155)

This invention relates to a valve body or fitting.

Among the objects of the invention is the provision of a valve body which may be readily attached to an existing pipe or pipe line and which is adapted to cooperate with a valve member for shutting off the flow of fluid therethrough.

Other objects of the invention will be apparent from the accompanying description and drawings.

This application is a division of copending application Serial No. 100,782, filed September 14, 1936 and is related to application Serial No. 122,249, which is also a division of application Serial No. 100,782.

Referring to the drawings:

Figure 1 is a view, partly in section, of the fitting applied to a pipe and a shut-off apparatus associated with the fitting.

Figure 2 is a transverse view, partly in section taken on the line 2—2 of Figure 1.

Figure 3 is a horizontal section taken on the line 3—3 of Figure 2.

Figure 4 is a detail sectional view of the fitting and shut-off apparatus shown in Figure 1, illustrating the relative positions generally assumed by the parts when the shut-off member is longitudinally compressed and distorted.

Figure 5 is a transverse sectional view taken on the line 5—5 of Figure 4.

Figure 6 is a horizontal section taken on the line 6—6 of Figure 2.

Referring more particularly to the drawings, the fitting 1 consists of a substantially cylindrical or tubular body 11, having an opening 12 at its upper end and closed at its lower end 13. The upper end is preferably threaded exteriorly at 14 (Figure 2) for the attachment of a gate valve or other apparatus, and the upper end is preferably also threaded interiorly as at 15, so that a threaded closure may be inserted.

The fitting is provided with aligned lateral openings 16, 17, which are adapted to receive the pipe or conduit 18 and the openings are bounded by the laterally extending hubs or flanges 19 and 20. The lower cylindrical portion is provided interiorly with a circumferential ledge or projection 28, which is adapted to serve as an abutment to limit the inward or downward movement of the shut-off member which, as will be described, is inserted through the open end of the fitting.

The fittings may be made of a high grade cast steel, of a composition similar to steel pipe, thereby insuring weldability, and are manufactured in various sizes for use with the pipes of various diameters. They are preferably formed initially as integral castings, although they may be formed otherwise, and in order that they may be attached to an existing pipe line, they are divided into two parts and then reunited, with the pipe passing through the lateral openings. The joinder of the two parts of the fitting and the attachment of the fitting to the pipe is preferably accomplished by welding along the side joints at 29 and around the peripheries of the hubs at 30. These operations are more fully described in copending application Serial No. 122,249 referred to above.

After a fitting has been welded to a pipe, a valve body 31 having a tapered valve seat 32 and provided with a valve, preferably a gate valve 33, operable by a handle 34, as shown in Figure 1, is threaded on the upper end of the fitting. An opening may now be established in the pipe and within the fitting, without substantial loss of fluid or fluid pressure by means of the method and apparatus described in the copending application referred to above.

Referring to Figure 1, the shut-off apparatus, generally designated at 50, includes an adapter 51, externally screw threaded at its lower end for attachment to the upper end of the valve body 31. The adapter, which may be made in various sizes, is preferably provided at its upper end with internal screw threads for the attachment of a chamber or housing 52.

The chamber 52 is preferably substantially cylindrical and its lower end, which is open, is externally screw threaded for engagement with the internal screw threads at the upper end of the adapter 51. An annular gasket 51' is inserted between the chamber or housing 52 and the adapter to provide a fluid tight joint. The chamber 52 comprises the substantially cylindrical side wall 53 and a centrally apertured top wall 54. The side wall 53 is provided with an internally threaded opening 55 for the connection of a by-pass line, if desired, but where the apparatus is to be used only for shutting off the flow of fluid through a pipe line to a pipe, the opening 55 may be sealed by the insertion of a conventional plug. The side wall of the chamber extends above the top wall 54 and the extension 56 is provided with internal threads for the attachment of a feed sleeve 57.

A bar 58 is slidably and rotatably mounted within the feed sleeve 57 and within the centrally apertured top wall 54 of the chamber or housing 52, a tight joint being maintained around the lower end of the feed sleeve, by means of a conventional packing 59 located between the feed sleeve 57 and the upper wall 54 of the chamber 52.

The bar 58 is provided at its upper end with an operating handle 60. Spaced collars 61 and 62 are fixed on the upper portion of the bar 58 and in order that the bar 58 may be forced upwardly or downwardly, a feed nut 63 is threaded on the feed sleeve 57 and may be connected with the bar 58 by means of a yoke 64 pivoted upon the feed nut 63 and having its head portion slotted as at 65 so that it may be swung into engagement with the bar 58 between the collars 61 and 62, as shown in Figure 1.

The lower end of the bar 58 is provided with a socket 66 provided with left-handed internal threads, and a lower counter-bored socket 67 internally threaded with right-handed threads. The lower end of the bar 58 is slightly enlarged to provide a shoulder 68 for the retention of a sleeve 69, the upper end of which is internally flanged at 70. The sleeve 69, which is adapted to be slipped on over the top of the bar 58, during the assembly thereof and before the handle 60 and collars 61 and 62 are attached, extends below the lower extremity of the bar 58 and is provided at its lower end with internal screw threads for the attachment of the shut-off means 71.

Referring to Figures 1 and 2, the shut-off means generally designated at 71, includes a substantially cylindrical member 72, made of some resilient material such as rubber. Disc-like caps 73 and 74, which are preferably inwardly flanged as shown at 75 and 76, are positioned above and below the member 72. The caps 73 and 74 and the member 72 are centrally apertured for the reception of a rod 77 on which they are slidably mounted. The rod 77 is provided at its upper end with a slightly enlarged head 78 and its lower end is threaded for the reception of a nut 79 whereby the member 72 may be clamped between the upper and lower caps 73 and 74 when the nut 79 is tightened. The nut 79 is preferably provided with slots on its under surface and the rod 77 is apertured at its lower end for the reception of the usual locking pin 80.

The cap 73 is provided with a central and upwardly extending cylindrical portion 81 which is externally threaded for attachment to the internally threaded sleeve 69.

When the cylindrical portion 81 of the cap 73 is threaded into the sleeve 69 it will abut the lower end of the bar 58 and it will therefore be apparent that downward pressure on the bar 58 will be directly transmitted to the cap 73. It will also be apparent that upward movement of the bar 58 will raise the cap 73 by reason of the fact that the internally flanged sleeve 69 engages the lower enlarged end of the bar 58 and also engages the upwardly extending central portion 81 of the cap 73.

The lower extremity of the bar 58, which forms the socket 67 is provided with slots 82, 82, adapted to receive lugs 83, 83, positioned on the upper surface of the cylindrical portion 81, as shown in Figure 12, whereby relative rotation of the cap 73, and consequently the member 72, with respect to the bar 58, will be prevented.

When the shut-off apparatus is attached to the upper end of the valve body 31, the shut-off member 72 will be withdrawn into a position within the chamber 52, this withdrawal being acomplished by disengaging the yoke 64 from the bar 58 and pulling up on the handle 60. After the shut-off apparatus 50 has been attached to the valve body and after all of the joints have been made tight, the valve 33 may be moved to open position.

The yoke 64 of the shut-off apparatus is now swung to upright position engaging the bar 58 between the collars 61 and 62, as shown in Figure 1, and the feed nut 63 is turned to the right to apply downward pressure, through the collar 62 and bars 58, to the cap 73.

The cap 74 at the lower end of the member 72 is held against downward movement by the abutments 28 of the fitting 1, and since the member 72 is made of resilient material, the downward pressure on the cap 73 will cause the member 72 to expand laterally as shown in Figure 4 and 5.

The caps 73 and 74 and the member 72 are slidable on the rod 77 and therefore the position which the rod will assume, after compression of the member 72, will not always be the same as it will depend, to some extent, upon the frictional quality of the resilient material of which the member 72 is made. Figures 4 and 5 illustrate one position which the rod 77 may assume and it will be noted that the cap 73 has moved downwardly a considerable distance from the head 78 of the rod 77, with the result that the head 78 is positioned within the socket 66. In view of this possible range of movement, the apparatus is preferably so designed that the diameter of the head 78 will be smaller than the internal diameter of the socket 66. It will also be noted that the fitting 1 should be of sufficient depth to allow for a considerable downward movement of the rod 78.

Upon expansion of the member 72 of the shut-off apparatus, it will be forced into contact with the adjacent walls of the pipe, as shown in Figures 4 and 5, and act as a valve to close off the section of the pipe which is below or downstream with respect to the member 72.

After the desired extensions or repairs are completed, the shut-off apparatus may be removed and a closure may be applied to the upper end of the fitting, without substantial loss of fluid or fluid pressure, in the manner described in copending application Serial No. 122,249, referred to above.

It will be understood that the fitting may be modified in various ways, as for example, by the provision of a flange at the upper end for the purpose of attaching flanged apparatus thereto.

It is, therefore, intended that all matter contained in the above description or shown in the accompanying drawings shall be regarded as merely illustrative.

The first step in the method of removing the shut-off apparatus consists in turning the feed nut 63, of the shut-off apparatus 2, to the left to relieve the downward pressure on the shut-off member 72. This will result in a lateral contraction of the shut-off member, owing to the resiliency of the material of which it is made, and, the fluid will flow through the spaces thus created between the shut-off member and the adjacent walls of the pipe.

The yoke 64 may then be disengaged from the bar 58, of the shut-off apparatus and the member 72 is drawn up into the chamber 52 by pulling up on the handle 60.

After the shut-off member 72 has been withdrawn, the gate valve 33 is operated to closed position, thus preventing flow of fluid into the shut-off apparatus, whereupon the shut-off apparatus may be detached without substantial loss fo fluid or fluid pressure.

In the foregoing description it was pointed out that fittings 1 are preferably of such size that their lateral openings have an appreciably greater internal diameter than the external diameter of the pipe or conduit to which the fitting is attached, and that the openings which are established in the pipe and within the fitting have a diameter which is preferably larger than the internal diameter of the pipe, as shown in Figures 5 and 6.

Since the above apparatus may be modified without departing from the scope of the invention, it is intended that all matter contained in the above description or shown in the accompanying drawings shall be regarded as merely illustrative.

We claim:

1. A valve body comprising a hollow substantially cylindrical member closed at one end and open at the other end, aligned lateral openings in said cylindrical member, a pipe extending through said lateral openings transversely of the said cylindrical member and an aperture in the top and bottom walls of said pipe and within said cylindrical member adapted to receive an expansible valve inserted through the open end of said cylindrical member, an internal projection adjacent the closed end of said cylindrical member against which one end of the said valve may abut, the wall of said pipe acting as a seat for the valve.

2. A valve body comprising a substantially cylindrical member closed at one end and open at the other end, aligned lateral openings in said cylindrical member, a conduit extending through said lateral openings transversely of the said cylindrical member, a portion of at least the top and bottom wall of the conduit within the cylindrical member being cut away so as to permit the insertion of an expansible valve through the open end of the cylindrical member and the expansion of said valve into sealing engagement with the walls of the conduit, and an internal projection adjacent the closed end of said cylindrical member against which one end of the expansible valve may abut.

TIMOTHY A. LARRY.
EARL E. CLINE.